United States Patent Office 3,105,833
Patented Oct. 1, 1963

3,105,833
4,5-DIHYDROXY-PIPERIDAZINES AND THEIR PRODUCTION
Rudolf Gabler and Hans R. Meyer, Zurich, Switzerland, assignors to W. R. Grace & Co., Cambridge, Mass., a corporation of Connecticut
No Drawing. Filed Apr. 3, 1962, Ser. No. 184,684
13 Claims. (Cl. 260—250)

This invention relates to 4,5-dihydroxy piperidazines and to their formation by the reaction of butadiene dioxide with a hydrazine, which may be unsubstituted, or may be either mono- or di-substituted at the nitrogen atoms.

The compounds of the present invention have the following structural formula:

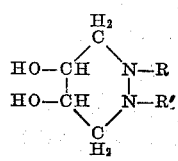

wherein R and R' are either the same or different radicals selected from the group consisting of hydrogen and the alpihatic, cycloaliphatic and aromatic radicals and specifically may be selected from hydrogen, methyl, ethyl, n-propyl, isopropyl, cyclohexyl, phenyl, halogenphenyl, nitrophenyl, benzyl, carboxymethyl, carboxyethyl, carboxyphenyl and carbonamide radicals and the like.

According to the present invention, such compounds are formed by the reaction of butadiene dioxide with a hydrazine, producing the 4,5-dihydroxy piperidazine in excellent yields according to the following reaction formula:

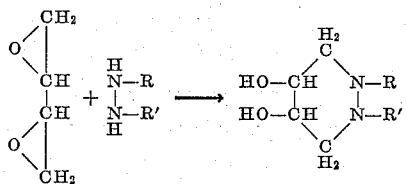

While 4,5-dihydroxy piperidazines may be prepared by reaction between a hydrazine and butadiene dioxide regardless of whether the hydrazine is unsubstituted, N-monosubstituted or N-disubstituted, it has been found that the reaction conditions must be varied considerably according to the degree of substitution of the hydrazine. If the hydrazine is disubstituted, the reaction conditions must be relatively more stringent, whereas for the unsubstituted or monosubstituted hydrazine, the reaction conditions must be relatively milder.

The disubstituted hydrazine reaction is generally carried out by mixing equimolar quantities of disubstituted hydrazine or of the corresponding hydrazo compound with butadiene dioxide and heating the mixture for a period of time. In most cases, the hydrazo compound dissolves readily in the butadiene dioxide upon warming. However, in some instances, the hydrazo compound does not dissolve in the butadiene dioxide or only dissolves reluctantly and in such instances an inert solvent such as tetrahydrofuran, dioxane, benzene, decaline, diphenyl ether and the like in which both reactants are soluble may be used to provide a mixture of the two reactants.

The reaction is preferably carried out at a temperature between room temperature and 200° C., the preferred range being between 80° C. and 100° C. The reaction can be carried out either in a batch method using an ordinary reactor or in a continuous method whereby a mixture of the butadiene dioxide and the hydrazo compound, including if necessary a solvent, is forced through a tube heated to the desired reaction temperature.

The butadiene dioxide used in the reaction may be in the d,l-form (melting point 6° C.), the meso-form (melting point −10° C.), or as a mixture of the d,l-form and the meso-form. The particular isomeric form of the butadiene dioxide does not affect either the reaction rate or the yield of the reaction but it does have some effect upon the melting point of the final product.

In this reaction, any N,N'-disubstituted hydrazine such as the hydrazo compounds may be used. Such N,N'-disubstituted hydrazines include specifically, the symmetric aliphatic disubstituted hydrazines such as dimethyl hydrazine, diethyl hydrazine, di-n-propyl hydrazine, di-isopropyl hydrazine, and the higher homologous aliphatic disubstituted hydrazines; the symmetric aromatic disubstituted hydrazines such as diphenyl hydrazine, as well as diphenyl hydrazines wherein the benzene rings have been halogenated, nitrated, or where the benzene rings contain ether groups as in the case of dinaphthyl hydrazine. The useful hydrazines may also be unsymmetrically substituted, as for example, N-methyl-N'-phenyl hydrazine or may possess polar groups such as, hydrazodicarbonamide and the esters and nitriles of hydrazodicarbonamide.

In general, any disubstituted hydrazine may be used irrespective of whether the substitute is symmetrical or unsymmetrical or of whether the substituent is an alkyl, an aryl, a cycloaliphatic, a mixed aromatic-aliphatic or a derivative thereof. Oddly enough, however, the disubstitution of the hydrazine appears to be necessary under these reaction conditions, since with a disubstituted hydrazine the reaction proceeds smoothly and relatively rapidly to a high yield, whereas if the butadiene dioxide is reacted with hydrazine itself or with a monosubstituted hydrazine, the reaction proceeds poorly to a very low yield and the reaction product is a mixture of a number of products.

Normally in the reaction involving disubstituted hydrazine, equimolar quantities of butadiene dioxide and the hydrazo compounds are used. However, an excess of either compound may be used without adversely affecting the reaction.

While the addition of the disubstituted hydrazine to the butadiene dioxide in most instances takes place without the aid of a catalyst, a catalyst may be used with advantage in connection with some of the more inactive hydrazo compounds such as those having polar substituents. Suitable catalysts include mineral acids, salts of mineral acids, Lewis acids, such as boron fluoride, zinc chloride and tin tetrachloride, as well as inorganic bases, amines, metal oxides and hydroxides.

The N,N'-disubstituted-4,5-dihydroxy piperidazines of the present invention are obtained after the removal of any solvent that may be present, in the form of an oily or solid product which may be purified by distillation, or by crystallization without difficulty.

The fact that the extremely reactive butadiene dioxide yields a corresponding dihydroxy piperidazine in a smooth reaction with a N,N'-disubstituted hydrazine is surprising, since one would normally expect that various competing reactions would occur such as (a) the alkaline-catalyzed poly addition of butadiene dioxide; (b) the linear 1,4 poly addition and (c) the 1,3 addition of the hydrazine to derivatives of the pyrazolidine. However, even under relatively vigorous experimental conditions (e.g. 100° C. for 20 hours without dilution), no such by-products were found even in trace quantities.

The reaction of unsubstituted or N-monosubstituted hydrazine with butadiene dioxide cannot be carried out under the reaction conditions described above. When this is attempted, the reaction does not produce the desired cyclic compounds, but instead yields an oily resinous mixture, the analysis of which has not been ascertainable.

It has been found, however, that by the use of essentially milder reaction conditions, unsubstituted and N-monosubstituted 4,5-dihydroxy piperidazines may be obtained by the hydrazine-butadiene dioxide reaction. By operating in an aqueous or alcoholic medium at moderate temperatures, generally not exceeding 20° to 40° C., undesirable side reactions, especially the base-catalyzed resinification of butadiene dioxide can be quite completely suppressed. The reaction may be carried out by adding butadiene dioxide dropwise, with stirring, to an aqueous or alcoholic solution of hydrazine or a monosubstituted hydrazine. In this case, the reactants are not used in molar proportions, but instead, an excess of hydrazine is used. Although as much as 5 moles of hydrazine may be used, it is generally preferred to use from 2 to 3 moles of hydrazine for each mole of butadiene dioxide. By employing an excess of hydrazine, the desired cyclic 1:1 adduct is obtained as the main product, whereas when equimolar proportions are used, substantial amounts of the 2:1 adducts (2 moles of butadiene dioxide:1 mole of hydrazine) as well as resinous products are formed.

The addition of hydrazine compounds to butadiene dioxide is accompanied by varying amounts of heat. Reaction with hydrazine itself is strongly exothermic and cooling must be applied in order to avoid formation of resinous by-products. The reaction of the more weakly basic hydrazines is less vigorous, and may occasionally, as for example in the case of phenylhydrazine, require prolonged heating of the reaction mixture.

When the reaction has been completed, which may be recognized by the disappearance of an epoxide reaction from the mixture, solvent and excess hydrazine are distilled off. The dihydroxy piperidazine compound is recovered from the residue by dissolving in an appropriate solvent, followed by vacuum distillation or crystallization.

If butadiene dioxide of technical purity is used, which in general consists of a mixture of d,l- and meso-isomers, mixtures of the corresponding cis- and trans-dihydroxy piperidazines are obtained. However, when sterically pure butadiene dioxides are used, the meso-form yields the cis-4,5-dihydroxy piperidazine and the d,l-form yields trans-4,5-dihydroxy piperidazine.

Unsubstituted hydrazine may be used in the above process as well as a variety of monosubstituted hydrazines, for example methylhydrazine, ethylhydrazine, n-propylhydrazine, isopropylhydrazine, cyclohexylhydrazine, phenylhydrazine, p-nitrophenylhydrazine, p-chlorophenylhydrazine, hydrazine carbonamide, hydrazine carbonic acid ester and various other monosubstituted hydrazines.

The addition of unsubstituted hydrazine to butadiene dioxide requires no catalyst. With some less reactive monosubstituted hydrazines, especially those containing phenyl radicals or polar groups, the use of catalysts to promote the reaction may be advisable. Suitable catalysts include the mineral acids, salts of mineral acids, Lewis acids such as boron fluoride, zinc chloride and tin tetrachloride, as well as inorganic bases, metal oxides and hydroxides, amines and quaternary ammonium bases.

The following examples are illustrative of the present invention:

EXAMPLE I

1,2-Diphenyl Piperidazine-4,5-Diol

A solution of 18.4 grams (0.1 mol) of hydrazobenzene in 8.6 grams (0.1 mol) of butadiene dioxide (approximately 90 percent d,l-form) is heated to the temperature of 100° C. for 20 hours. At the end of the reaction period, the red-brown resinous reaction product was dissolved in 80 cubic centimeters of benzene and thereafter 40 cubic centimeters of petroleum ether was added to the warm solution. This solution was permitted to cool slowly and when cool, the glass wall of the container was scratched and a voluminous precipitate settled out. This precipitate was then filtered, washed with 60 cubic centimeters of a benzene-petroleum ether mixture and dried under vacuum at 60° C. A yield of 20.7 grams (77 percent of theoretical) of 1,2-diphenyl piperidazine-4,5-diol melting at 110–111° C. (corrected) was obtained. A completely colorless pure product, melting at 112° C. (corrected), was obtained by recrystallizing this product from a benzene-petroleum ether mixture. The recrystallization may be also accomplished by using carbon tetrachloride.

EXAMPLE II

1,2-Diethyl Piperidazine-4,5-Diol 8.6 grams (0.1 mol) of butadiene dioxide (approximately 90 percent d,l-form) was added carefully dropwise to 10.2 grams (0.1 mol) of 86 percent diethyl hydrazine (the remainder being ethylidene hydrazine) which had been heated to 80° C. The reaction mixture was agitated during the addition and the rate of addition of butadiene dioxide was controlled so that the temperature of the reaction mixture did not exceed 100° C. A brownish, viscous oil formed which was distilled under reduced pressure. 15.5 grams of the yellowish, viscous, 1,2-diethyl piperidazine-4,5-diol was obtained. This material melts at 107° C. at a pressure of 0.05 mm. Hg and solidifies on standing. The yield was 89 percent of theoretical.

EXAMPLE III

Example I was repeated using meso-butadiene dioxide rather than d,l-butadiene dioxide. A 73 percent of theoretical yield of 1,2-diphenyl piperidazine-4,5-diol was obtained having a melting point after recrystallization of 111° C. (corrected) as compared to the melting point of the product obtained in Example I of 112° C. (corrected). While the stereo-isomeric compounds show almost the same melting point, they are not identical as shown by a depression of melting point of mixtures of the two. Both the trans-compound (formed with d,l-butadiene dioxide) and the cis-compound (formed with the meso-butadiene dioxide) having the interesting property of forming a colorless solution in water of pH's in excess of 7 but of forming an intense blue color when the solution is acidified.

EXAMPLE IV

Trans-Piperidazine-4,5-Diol 51.7 grams (0.6 mol) of butadiene dioxide (predominantly d,l-form) was added dropwise with stirring to a water-cooled reactor containing a 30 percent aqueous solution of 57.7 grams (1.8 mols) of hydrazine at such a rate that the temperature inside the reactor did not exceed 30° C. The addition took approximately one hour. Excess hydrazine and water were distilled off under reduced pressure and the viscous, colorless residue was dissolved in 200 cubic centimeters of warm ethyl alcohol. The solution was permitted to stand overnight, during which time the product precipitated out in the form of colorless crystals. The precipitate was then filtered, washed with alcohol and dried. A yield of 21.4 grams (30 percent of theoretical) of crude trans-piperidazine-4,5-diol melting at 233° C. was obtained. Recrystallization from 50 percent aqueous alcohol yielded a pure product melting at 246° C.

EXAMPLE V

Cis-Piperidazine-4,5-Diol 25.8 grams (0.3 mol) of meso-butadiene dioxide was added dropwise with stirring to a water-cooled reactor containing a 20 percent aqueous solution of 28.8 grams (0.9 mol) of hydrazine over a period of approximately one-half hour. The temperature inside the reactor was maintained between 25° and 30° C. Excess hydrazine and water were then distilled off under vacuum and the residue was dissolved in ethyl alcohol. After a period of standing, a colorless precipitate of cis-piperdiazine-4,5-diol was gradually formed. The mixture was allowed to stand for 48 hours, after which the precipitate was filtered, washed with alcohol and dried. A yield of 10.9 grams (31 percent of theoretical) of crude cis-piperidazine-4,5-diol melting at about 130° C. was obtained. Repeated recrystallization from ethanol or methanol yielded a pure product melting at 146° C.

EXAMPLE VI

N-Methyl Piperidazine-4,5-Diol 5.16 grams (0.06 mol) of butadiene dioxide was added dropwise with stirring to a water-cooled reactor containing 19.8 grams (0.075 mol) of a 17.4 percent aqueous solution of methyl hydrazine over a period of one hour. The temperature of the reaction mixture was maintained between 25° and 30° C. After removal of excess methyl hydrazine and water by distillation under reduced pressure, the colorless residue was distilled under a high vacuum. A yield of 6.9 grams of crude N-methyl piperidazine-4,5-diol having a boiling point of 135° to 155° C. at 0.2 mm. Hg was collected in the receiver. The product could be further purified by fractional distillation.

The reaction between butadiene dioxide and unsubstituted or N-monosubstituted hydrazine, which has been shown in the above three examples in aqueous solution, may also be carried out in solution in ethanol.

The 4,5-dihydroxy piperidazines, whether unsubstituted, N-monosubstituted or N-disubstituted are in general water-soluble or water-miscible chemical compounds which possess surface activity and are useful as surface-active agents in a variety of applications. They may also be condensed with dicarboxylic acids to form hard, resinous masses possessing ion-exchange properties. For example, one and one-tenth mols of the 4,5-dihydroxy piperidazine may be condensed with one mol of terephthalic acid by reacting in the molten state at a temperature of 250° to 275° C. until the acid number has been reduced to less than ten or until the esterification is essentially completed. The process may be aided by the use of vacuum in the later stages. After cooling, the hard resinous mass may be ground into small granules, which have the property of absorbing acids and are capable of being regenerated by an alkaline wash. The product may be used as an anion exchange resin in the deionization of water or for recovering acid materials from complex reaction mixtures or for any other use in which an acid-absorbing ion exchange resin may be applied.

This application is a continuation-in-part of co-pending application Serial No. 95,475, filed March 14, 1961, now abandoned.

We claim:
1. A 4,5-dihydroxy piperidazine of the formula:

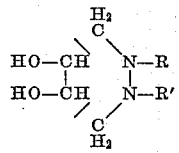

wherein R and R' are each a member selected from the group consisting of hydrogen, methyl, ethyl, n-propyl, isopropyl, cyclohexyl, phenyl, halogenphenyl, nitrophenyl, benzyl, carboxymethyl, carboxyethyl, carboxyphenyl and carbonamide.
2. 1,2-diphenyl piperidazine-4,5-diol.
3. 1,2-diethyl-piperidazine-4,5-diol.
4. Piperidazine-4,5-diol.
5. N-methyl piperidazine-4,5-diol.
6. The process of preparing a 4,5-dihydroxy piperidazine of the formula:

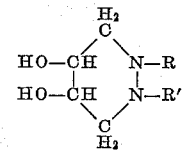

wherein R and R' are each a member selected from the group consisting of hydrogen, methyl, ethyl, n-propyl, isopropyl, cyclohexyl, phenyl, halogenphenyl, nitrophenyl, benzyl, carboxymethyl, carboxyethyl, carboxyphenyl and carbonamide, which comprises reacting butadiene dioxide with a hydrazine of the formula:

wherein R and R' are each a member selected as above.
7. The process of claim 6 wherein the hydrazine is N,N'-disubstituted, and wherein the reaction is carried out between 80° and 100° C.
8. The process of claim 6 wherein the hydrazine is N-monosubstituted, and wherein the reactants are in solution in a solvent selected from the group consisting of water and ethanol and the temperature does not exceed about 40° C.
9. The process of claim 6 wherein the hydrazine is unsubstituted and wherein the reactants are in solution in a solvent selected from the group consisting of water and ethanol and the temperature does not exceed about 40° C.
10. The process for preparing 1,2-diphenyl piperidazine-4,5-diol which comprises reacting butadiene dioxide with hydrazo benzene.
11. The process for preparing 1,2-diethyl piperidazine-4,5-diol which comprises reacting butadiene dioxide with diethyl hydrazine.
12. The process for preparing piperidazine-4,5-diol which comprises reacting butadiene dioxide with hydrazine.
13. The process for preparing N-methyl piperidazine-4,5-diol which comprises reacting butadiene dioxide with methyl hydrazine.

No references cited.